Oct. 15, 1968
PAUL H. C. YIN
3,405,868
SLIDE RULE
Filed April 10, 1967
2 Sheets-Sheet 1
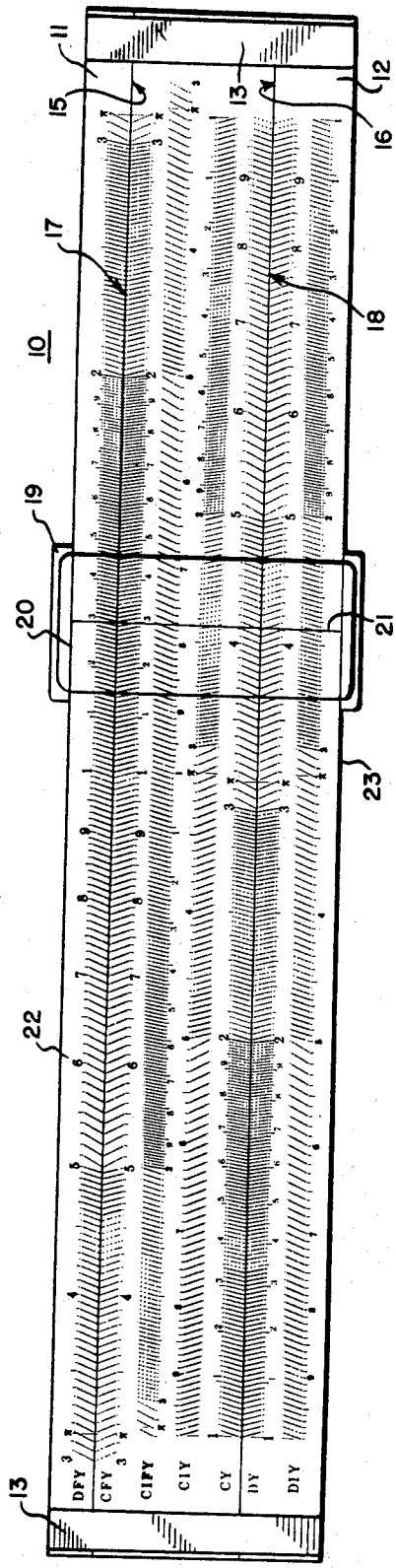
FIG. I
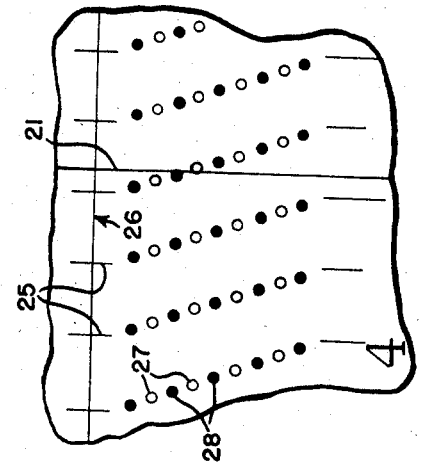
FIG. 4
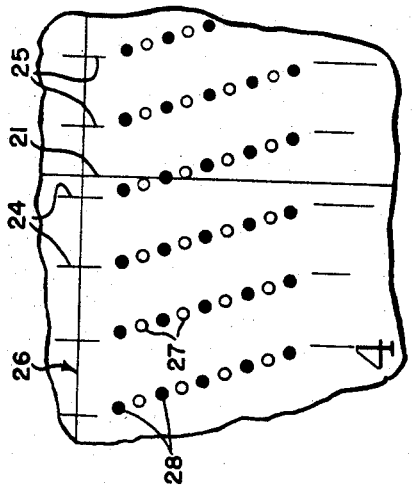
FIG. 3
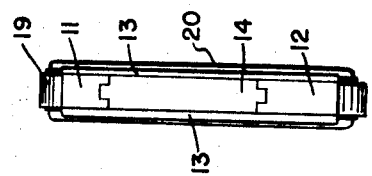
FIG. 2
INVENTOR
PAUL H. C. YIN
ATTORNEYS Oct. 15, 1968   PAUL H. C. YIN   3,405,868
SLIDE RULE Filed April 10, 1967   2 Sheets-Sheet 2

INVENTOR
PAUL H. C. YIN

BY *Pennie, Edmonds, Morton, Taylor and Adams*
ATTORNEYS

United States Patent Office
3,405,868
Patented Oct. 15, 1968

3,405,868
SLIDE RULE
Paul H. C. Yin, 305 Riverside Drive,
New York, N.Y. 10025
Filed Apr. 10, 1967, Ser. No. 629,805
4 Claims. (Cl. 235—70)

ABSTRACT OF THE DISCLOSURE

Slide rule and other types of calculating and measuring instruments which provide a numerical reading by the relative position of two slidable elements corresponding to the result of the calculation or to the measurement, are equipped with improved scales capable of giving more precise reading with a cursor. The scale for the slide rule comprises a conventional logarithmic scale with straight line markings and a plural series of dots with variable color intensities. Each series of dots occupies the space between two straight line markings and the dots are plotted in accordance with the logarithmic relationship so that a line passing through all the dots within the series intersects with a horizontal line along which the log scale is marked, to form an acute angle. The reading is provided by the relative position of the hair line of the cursor with respect to the dots.

BACKGROUND OF THE INVENTION

Field of the invention

This invention relates to calculating and measuring instruments such as slide rules which provide a numerical reading by the relative position of two slidable elements corresponding to the result of a calculating manipulation or to the measurement. More particularly, the present invention relates to an improved instrument of the type described, capable of giving more precise readings without using extra manipulating steps or equipment.

Description of the prior art

A conventional slide rule with a scale length of 10 inches is capable of giving a reading accurate to not more than 3 or 4 digits and oftentimes the last digit is determined by estimation. The degree of accuracy also applies to other types of calculating or measuring instruments, such as caliper rules.

Attempts have been made to improve the accuracy or to provide more precise reading of the scales of the instruments. The prior attempts include the development of special cursors with two or more moving parts which are used in combination with specially designed scales. To use this type of cursors generally requires the movement or the alignment of hair lines on two separate transparent runners. The advantages of improved accuracy provided by this type of instruments are usually offset by the inconvenience and the added costs for the construction of the instruments.

SUMMARY OF THE INVENTION

I have now found that calculating and measuring instruments with improved accuracies can be constructed simply and effectively without special cursors. Broadly stated, the instrument of this invention comprises two slidable elements and a cursor mounted thereon. The first of the elements has a smooth edge, a flat surface adjacent to the edge and a scale on the flat surface with a plurality of straight line markings positioned along and normal to the edge and spaced apart from each other at distances according to a mathematical relationship. The second of the elements abuts to and is slidably mounted on with respect to the first element to form with the smooth edge of the first element an adjoining edge between the two elements. A cursor is used to cover a portion of the flat surface of the first element and is slidable with respect thereto.

At least one series of dots is provided on one of the elements or on the cursor. The dots have variable intensities between neighboring ones and are positioned so that an inclined line passing through all the dots in the series intersects with the adjoining edge to form an acute angle therewith. The dots in each series are spaced apart at distances according to the mathematical relationship and occupy a space equivalent to the space within two adjacent straight line markings. The number of dots in each series advantageously is equal to one less than the number of desirable subdivisions between two adjacent straight line markings. The series of dots is so arranged that it is capable of intersecting a straight line on one of the elements or on the cursor to indicate the relative position of the two slidable elements and to provide a more precise numerical reading based on the position of the intersecting straight line and the position of the dots within the series.

For a slide rule, the straight line markings as well as the positions of the dots are based on the well-known logarithmic relationship. It is preferred that a plural series of dots are used, each corresponding to one of the straight line markings. In such cases a conventional cursor with a straight hair line is used to provide more accurate readings. In some other types of instruments, such as caliper rules, one series of inclined dots is all that is necessary for providing a more accurate reading. In such instruments, the series of dots is on the cursor and a reading is obtained by the intersecting of the straight line markings with the inclined dots.

BRIEF DESCRIPTION OF THE DRAWINGS

FIG. 1 is the front view of a slide rule embodying the improvements of the present invention;

FIG. 2 is the end view of said slide rule;

FIG. 3 and FIG. 4 are fragmentary enlarged views of the scale with the hair line of the cursor at different positions to illustrate the improved accuracies of the slide rule shown in FIG. 1;

DESCRIPTION OF THE PREFERRED EMBODIMENTS

Figure 5:
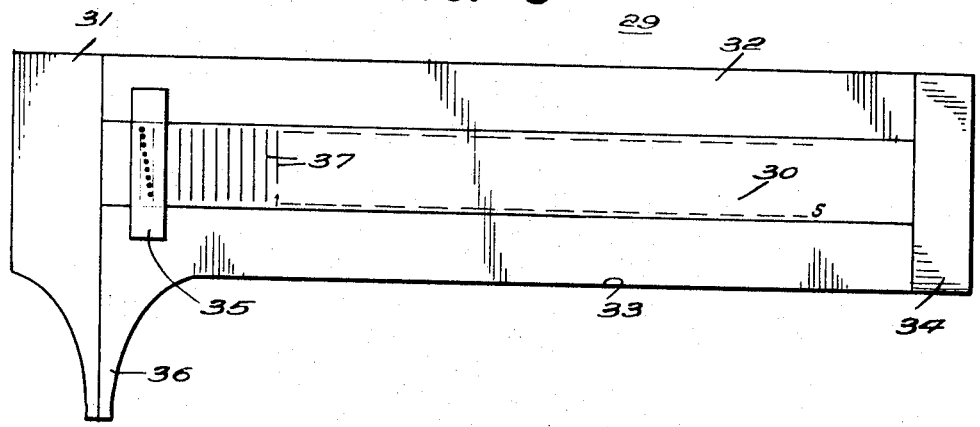
FIG. 5 is the front view of a caliper rule showing a second embodiment of the present invention.

Referring initially to FIG. 1, the slide rule 10 embodying the improvements of the present invention has two stationary rails 11 and 12 joined at the ends thereof by brackets 13, and a movable rail 14 arranged for sliding engagement with the stationary rails 11 and 12. The two opposite edges 15 and 16 of the rail 14 are in abutting relation with the two smooth edges 17 and 18 of the stationary rails 11 and 12 respectively. A cursor 19 with a transparent surface 20 and a hair line 21 is mounted on the slide rule 10 and is slidable on the outer edges 22 and 23 of the stationary rails 11 and 12 respectively.

The slidable arrangement of the stationary and movable rails are more clearly illustrated in the end view (see FIG. 2).

For the purpose of illustration, three stationary scales DY, DIY, and DFY and four movable scales CY, CIY, CIYY, and CFY are provided on the stationary and movable rails respectively. These scales embodying the improvements of this invention, as will be explained in greater detail hereinbelow, serve the same functions as the conventional C, CI, CIF, CF, DF and DI scales, which are constructed in accordance with the logarithmic relationship. The designation Y is used following the conventional designations for the new scales to avoid possible confusion.

The new scales are similar to the conventional ones to the extent that the spacings of the scale, as indicated by the straight line markings 24 and 25 on the movable and stationary rails respectively, more closely shown in FIGS. 3 and 4, are the same. The short straight line markings 24 and 25 are normal or perpendicular to the adjoining edge 26. To increase the accuracies of the conventional scale, however, each of the scales between the straight line markings is expanded by the provision of a series of dots 27 and 28 with variable intensities, the former being hollow circular marks and the latter solid circular marks. It is understood that different colors or hues may be used to differentiate the adjacent or the neighboring dots. The preferred arrangement is to provide the odd number dots with one color or distinct circular mark and the even number with a contrasting color or marking.

In constructing the scale, a given section of the scale is first divided into 10 subsections (or any number of subsections which will provide a simple readout) and each of the subsections is then represented by a dot positioned on the scale by plotting according to the logarithmic relationship:

$$X = \log Y$$

wherein the Y represents the numerical value of the scale and X the log value. For example, sections between the straight line markings of 1,000 to 1,020 on the scale, the values of the X and Y for the subsections are as follows:

| Y | X |
|---|---|
| 1.000 | 0.00000 |
| 1.001 | 0.00043 |
| 1.002 | 0.00087 |
| 1.003 | 0.00130 |
| 1.004 | 0.00173 |
| 1.005 | 0.00217 |
| * | * |
| * | * |
| * | * |
| 1.010 | 0.00432 |
| 1.012 | 0.00518 |
| * | * |
| * | * |
| * | * |
| 1.020 | 0.00860 |

These values are used to plot each series of nine dots of the subsections.

The dots are plotted in the form of a curve which extends diagonally across the section, and each dot falls on a spot representing precisely a one-tenth value of the section. For example, if the section represents the values of 1.000 to 1.010, the nine dots which covers the section are plotted precisely to read 1.001, 1.002, 1.003, 1.004 1.005, 1.006, 1.007, 1.008 and 1.009, respectively. The procedure in plotting the dots to form diagonal curves is repeated section after section until the new scale is completed.

As mentioned hereinbefore, the new scales which have the extra designation of Y have the same application as the equivalent conventional scale except that the scale used in the slide rule of this invention provides more precise reading. To use the new slide rule, conventional mathematical manipulations of the slide rule are performed giving a reading as indicated by the hair line 21, which is at a position which either intersects with or by-passes one of the nine dots in the series between the subdivisions. This position of the hair line provides an accurate reading with minimum of estimation or guessing.

It is to be noted that the nine-dot diagonal curve is carefully planned so as to occupy a minimum space in the vertical direction, which space is limited by the width of the slide rule and yet provide a precise reading with an extended fractional value. The minimum space of the vertical extension keeps the width requirement of a ten inch slide rule within the convenient size for ease of handling.

An important aspect of this invention is in the arrangement of dots on the curve. The solid monotone dots nine in number on a curve would generally cause a reader to count the number of dots first from the first dot on the curve to the dot cut by the hair line in order to arrive at an accurate value. Since the dots are small, the counting may be time consuming and not too easy on the eyes. In either case the speed in calculation may be interfered. The present invention overcomes this problem by providing the solid and hollow dots as described hereinabove. If the nine dots represent the values from 1 to 10, the solid ones will have odd values of 1, 3, 5, 7, and 9, and hollow ones, 2, 4, 6, and 8. If the nine dots represent values from 4.100 to 4.150, the solid dots will have the values of half size numbers ending in 5 to read as 4.105, 4.115, 4.125, 4.135, and 4.145 respectively and the hollow dots represent the whole numbers ending in 10 to read as 4.110, 4.120, 4.130, and 4.140. The solid and hollow alternative arrangements present the dots in pairs, four and one half for each curve, a number small enough to enable the reader to scan them through and to call out a precise reading readily, without having gone to the trouble of counting. Furthermore the solid and hollow alternative arrangement presented in pairs automatically enlarges the viewing space which provides an easy reading to the eyes. The ease of reading is illustrated in FIGS. 3 and 4 which as shown have the reading of 4.115 and 4.1175 respectively.

Figure 6:
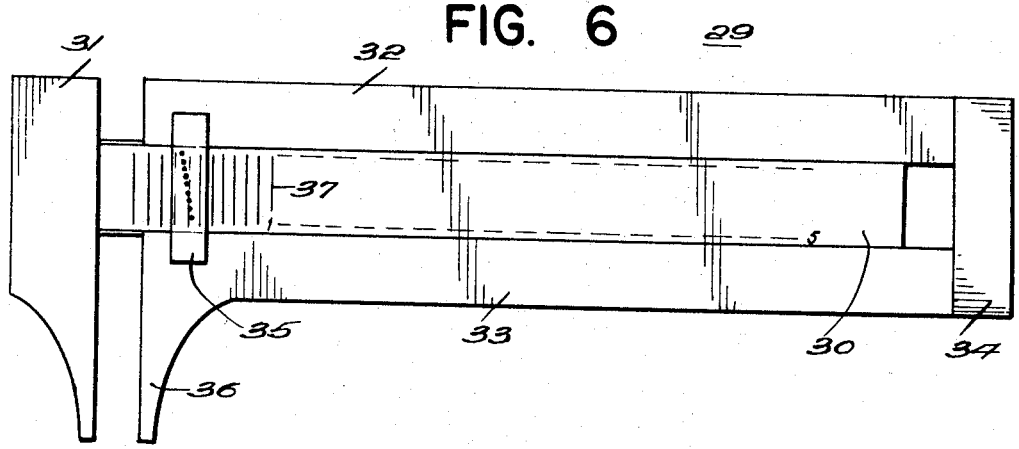
FIG. 6 is the front view of the caliper rule shown in FIG. 5 illustrating its operation.

Referring now to FIGS. 5 and 6, the caliper rule 29 has a movable rail 30 having at one of its end attached to a jaw 31 and two stationary rails 32 and 33 held in position by bracket 34 and a cursor 35. The lower stationary rail 32 has at one of its ends a fixed jaw 36. The caliper rule is provided with a conventional scale (a metric scale or a British scale) in the form of vertical lines 37.

On the cursor there is a series of dots, nine in number (for the metric scale or 7 in number for the British scale with ⅛ divisions). The construction of the dots is substantially described hereinabove with the exception that the positions of the dots fall on a straight line and the spacings between the dots are equal. The dots falling on a straight line instead of a curve is due to the difference in the spacing relationship which is now in a digital system rather than in a logarithmic arrangement required by the slide rule. As shown in FIG. 6, the movement of the rail 30 brings the straight line markings 37 to intersect with the diagonally arranged dots thus providing a more precise reading.

I claim:
1. A slide rule capable of providing a numerical reading based on the relative position of two slidable elements which slide rule comprises:
   a first of said elements having,
      a smooth edge,
      a first flat surface adjacent to said edge, and
      a scale on the flat surface with a plurality of straight line markings positioned along and normal to said edge and spaced apart from each other at distances according to a logarithmic relationship;
   a second of said elements abutting to and slidably mounted with respect to the first element and forming with said smooth edge an adjoining edge between the two elements,
      a second flat surface adjacent to the adjoining edge, and
      a second scale on the second flat surface with a plurality of straight line markings positioned along and normal to said edge and spaced apart from each other at distances according to the logarithmic relationship of said first scale;
   a cursor covering a portion of the flat surface of said first and second elements and slidable with respect thereto,
> a hair line on said cursor parallel to the straight line markings on the first and second elements; and a plural series of dots on the first element and a plural series of dots on the second element,
> each of said plural series of dots being variable in intensities between neighboring ones and being positioned so that an extension of a line passing through all the dots in the series intersects with the adjoining edge to form an acute angle therewith,
> the dots in each series being spaced apart at distances according to the logarithmic relationship occupying within a space within two adjacent straight line markings,
> the number of dots in each series being equal to one less than the number of desirable subdivisions between two adjacent straight line markings, and
> said series of dots being capable of intersecting a straight line on one of the elements to indicate the relative position of the two slidable elements providing a numerical reading.

2. An instrument according to claim 1 wherein nine dots are provided in each series.

3. An instrument according to claim 2 wherein the odd number of dots and the even number of dots in each series have different color intensities.

4. An instrument according to claim 3 wherein the alternative dots are hollow circular marks and solid circular marks.

References Cited

UNITED STATES PATENTS

| | | | |
|---|---|---|---|
| 1,231,934 | 7/1917 | Packet | 33—143 |
| 1,338,932 | 5/1920 | Jaques | 33—166 |
| 1,490,210 | 4/1924 | Hsieh | 116—129 |
| 2,385,948 | 10/1945 | Setera | 235—70 |
| 2,387,404 | 10/1945 | Moyer | 235—70 |

RICHARD B. WILKINSON, *Primary Examiner.*

STEPHEN J. TOMSKY, *Assistant Examiner.*